(12) United States Patent
Cameron

(10) Patent No.: US 6,890,439 B2
(45) Date of Patent: May 10, 2005

(54) BIOLYTIC FILTRATION

(75) Inventor: Dean Osman Cameron, Maleny (AU)

(73) Assignee: Dowmus Pty. Ltd., Brisbane (AU)

( * ) Notice: Subject to any disclaimer, the term of this patent is extended or adjusted under 35 U.S.C. 154(b) by 61 days.

(21) Appl. No.: 10/275,251

(22) PCT Filed: May 22, 2001

(86) PCT No.: PCT/AU01/00590
§ 371 (c)(1),
(2), (4) Date: Nov. 7, 2002

(87) PCT Pub. No.: WO01/90007
PCT Pub. Date: Nov. 29, 2001

(65) Prior Publication Data
US 2003/0116488 A1 Jun. 26, 2003

(30) Foreign Application Priority Data
May 22, 2000 (AU) .............................................. PQ7681

(51) Int. Cl.⁷ ................................................. C02F 3/10
(52) U.S. Cl. ..................................... 210/617; 210/151
(58) Field of Search ................................ 210/615, 616, 210/617, 150, 151

(56) References Cited

U.S. PATENT DOCUMENTS

| | | | | |
|---|---|---|---|---|
| 3,227,429 A | * | 1/1966 | Renzi | ....................... 261/112.1 |
| 4,005,010 A | * | 1/1977 | Lunt | .......................... 210/615 |
| 4,195,043 A | * | 3/1980 | Foote et al. | ................... 261/94 |
| 5,389,248 A | | 2/1995 | Pare et al. | |
| 5,500,112 A | | 3/1996 | McDonald | |

* cited by examiner

Primary Examiner—Robert A. Hopkins
(74) Attorney, Agent, or Firm—Hoffman, Wasson & Gitler, P.C.

(57) ABSTRACT

A filtration bed support for biolytic filtration wherein the filtration bed comprises a bed of solids in various stages of decomposition ranging from raw unprocessed organic material on the surface of the bed to fully decomposed humus which forms the bulk of the bed. The bed is kept from blocking by living organisms. The support comprises a three dimensional humus matrix lattice.

16 Claims, 1 Drawing Sheet

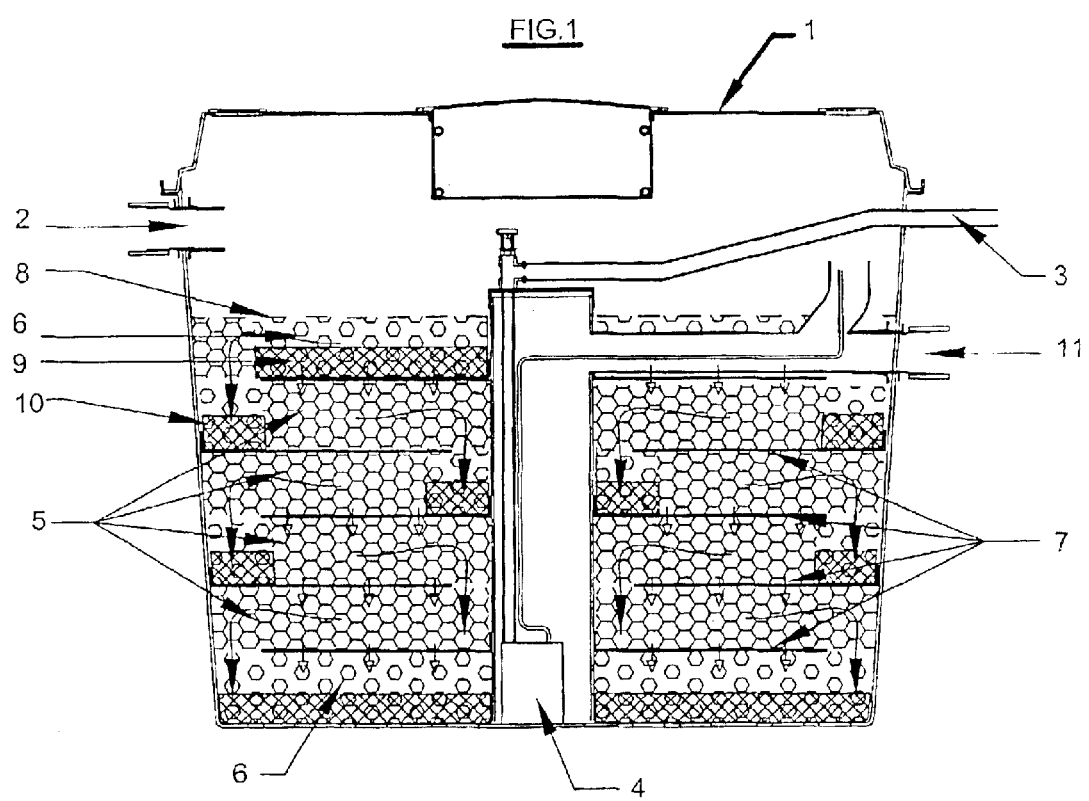

BIOLYTIC FILTRATION

BACKGROUND OF THE INVENTION

This invention relates to an improved biolytic filtration protocol for wastewater and solid organic waste material, and is particularly concerned with the use of a structural framework to facilitate such filtration protocol.

The type of biolytic filtration with which the present invention is concerned, is the subject of a portfolio of patents held by the applicant and which is typified by U.S. Pat. No. 5,633,163. The biolytic filtration consists of the simultaneous treatment of wastewater and solid organic waste material on a bed of solids in various stages of decomposition ranging from raw unprocessed organic material added to the surface of the bed, through to fully decomposed humus which is a very active filtration matrix and which forms the bulk of the bed. The bed is kept from blocking through the action of a farm of living organisms selected from worms, insects, crustaceans, mites and the like which create pores throughout the filtration matrix. The humus matrix column is in fact a 'structured water column' such that oxygen is still able to penetrate the column. The humus matrix is only approximately 10% solid volume and the rest is pore spaces that are filled predominantly with water.

One of the limitations of the aforementioned biolytic filtration protocol is that the surface area of the bed determines the amount of wastewater that can be regularly applied over a long period of time, and the amount of treatment possible is dependent upon the depth and volume of the bed and the hydraulic retention time in the bed. The depth of the bed however cannot be increased beyond a certain limit without the lower layers of the bed being crushed by the weight of the bed itself and the pore spaces destroyed so that blockage can result.

A second limitation is that the surface layer of the bed is by far the most biologically active and diverse zone where the most rapid biolysis takes place. Both living organism population density and species diversity decrease with humus matrix depth. The surface area of the biolytic filter bed container therefore limits the amount of wastewater or high solids slurry that can be applied to the biolytic filter bed, and the failure mode is related to the capacity of air and water to penetrate into the bed.

A third limitation is that the treatment of wastewater by the humus matrix, which requires removal of dissolved and suspended organic material, is compromised when typical flow peaks are applied to the bed as they create channel flow through the bed which erodes the bed so adding suspended solids to the filtrate and results in short effluent retention times.

A fourth limitation of the biolytic filter is that the biological activity in the system is vulnerable to flooding or prolonged inundation. If the adult population of the living organisms in the system are drowned, the population takes several weeks to recover and may need re-inoculating. This could be a logistical problem and considerable expense in a remote installation.

OBJECT OF THE INVENTION

It is therefore an object of the present invention to provide an improved biolytic filtration protocol that overcomes or at least minimises the aforementioned limitations.

SUMMARY OF THE INVENTION

According to the present invention, there is provided in a biolytic filtration protocol of the type hereinbefore described, the improvement wherein the filtration bed is formed within and supported by a three dimensional humus matrix lattice,

DETAILED DESCRIPTION OF THE INVENTION

Preferably such a humus matrix support lattice is constituted as an open three-dimensional structural support framework formed from any one of a wide variety of inert solid materials ranging from plastics materials through metals to composites and fired natural products, and combinations of these. The architecture of the humus matrix support lattice will be chosen so as to create the maximum possible exposed approximately horizontal humus matrix surface area to bed volume ratio and also humus matrix volume to bed volume ratio.

The constitution of the bed as a plurality of discrete but interconnected matrix bed elements addresses the aforementioned problem of hydraulic surface overload failure, as any excess effluent or slurry added to the top of the bed can overflow onto other humus matrix surfaces located lower down in the bed arrangement. If formed in a container of a given size, the invention allows for the formation of a high volume humus matrix bed that will not suffer from internal blockage due to mechanical failure of the humus matrix and thus loss of internal pore spaces within the humus matrix. In addition to this benefit, the humus matrix which forms the beds of the biolytic filter has a capacity to absorb and hold water which contacts the surfaces of the matrix much as a sponge soaks up free water and then allows it to drain over time under gravity. The hydraulic exchangeable volume involved in this process is about 5–10% of the bed volume, which means that the higher the volume of the bed the higher the treatment capacity will be. The reliability of the process is thus enhanced at the same time as the treatment performance is improved for a given hydraulic flow rate and container size because of the ability to configure a higher volume of humus matrix without it collapsing.

It will be readily apparent to the skilled addressee that the provision of discrete but interconnected bed surfaces arranged vertically within a humus matrix support lattice configured bed, effectively increases the oxygen exposed surface area, aeration, drainage, biological activity and stable volume of the biolytic filter without enlarging the surface area of its container. However structural containment is not a necessary requirement for the invention as the humus matrix support lattice could equally well be formed into stackable elements to form a free standing structure that could, for instance be buried direct in a flexible membrane or stacked within a tank or room chamber. This provides significant economic benefits for the cost of structural containment over most other known treatment systems where the tank cost can be up to 50% of the materials cost in a treatment system.

The aforementioned humus matrix support lattice can be created by a number of different physical forms, including a random arrangement of loose open support aggregate, open support aggregate which has been bagged in a mesh bag to form a mouldable semirigid stackable element or a stackable arrangement of rigid crate modules. The loose open support aggregate should have an architecture such as to:

1. Support a large amount of humus with respect to the total volume occupied.
2. Create a large humus matrix surface area to volume ratio.
3. Provide large permanent bed channels within the bed which allow excess effluent to pass through rapidly.

4. Provide a screening action which prevents gross solids passing through to the effluent storage area below the bed.

Such elements can be of any free form design but because of their typically discrete and random arrangement are required to be contained within the bounds of a rigid walled container if placed loose to form a bed. Such a container however is not limited to any particular configuration and can thus assume any desirable shape or size, which the particular situation calls for, to maximise the efficiency of aerobic processing of the organic solids and wastewater.

Suitable discrete support elements include irregular pieces of plastics materials, ceramics, and the like. A particularly preferred arrangement comprises a corrugated plastic agricultural drainage pipe that is cut into discrete lengths which approximate the diameter of the pipe, and which are randomly arranged within a container.

One drawback of forming a bulk humus matrix composed of discrete support elements placed randomly inside a container of a particular shape is that it is difficult to structure the bed to perform particular additional functions such as create air channels, effluent flow buffers, drainage spaces or effluent storage spaces within the bed. Its use is essentially restricted to horizontal beds supported at the sides and base by other structural elements. A second drawback is that it can be difficult to service if some or all of the humus matrix bed needs to be removed from the container. This task would have to be performed by bulk handling equipment such as a gully eductor or manually with shovels and bags or the like. An innovative approach to removing these limitations is to form the bed as discrete stackable elements which one person can easily handle.

Open support aggregate, which has been confined within open mesh bags has the advantage of being able to be easily handled manually and stacked into a low pile, shallow self supporting excavation, or placed into any shaped container to form a humus matrix support lattice treatment bed which has the advantages that it is:

1. Cheap to construct.
2. Easy to service without specialist bulk handling equipment.
3. Can be configured to have functional voids.
4. Can be configured with treatment partitions to enhance treatment performance.

The rigid stackable crate elements are preferably designed to fit or interlock with one another and enable a containerless arrangement to be constructed. A particularly suitable design is a crate. In this configuration the structural framework for supporting the humus matrix consists of structural crate elements which fit or lock together discretely and formally to form an integrated lattice which has sufficient structural rigidity to enable the whole structure when lined with a light weight plastic liner to be buried direct in the soil without collapse or flotation.

Ideally this type of structural crate element should be mouldable using a pressing or injection moulding technique and should contain the lowest possible material content needed to provide the structural rigidity required for use and transport. Ideally the elements should be made as identical modules, which can be nested into a compact volume for transport and arranged on site into a high volume high strength lattice structure. A further advantage of this approach is that the crate elements can be arranged or cut in such a way as to formally create desired functional spaces within the whole assembled structure such as for effluent inlet wastewater flow, effluent distribution, pump wells, solids accumulation, raw organic waste deposition/distribution, air flow, drainage and effluent storage. The obvious advantage of this is that functional spaces and support structure which would otherwise have to be provided by specific material structures to create spaces needed are created by an absence of materials and so rather than contribute extra cost they represent a savings in materials and hence cost.

The discrete support elements and framework modules contain or create openings to allow air, water and solid material to move into and out of the bed elements and modules. The size of the openings created should be tailored to regulate the solids retention in the bed elements and modules. The desired outcome is for the beds to remain in a stable equilibrium such that the volume of the solids added to the beds over a given period of time is equal to the solids metabolised in and shed from the bed elements and modules over that time. To achieve this the bed should have a large surface volume relationship and also a mechanism for controlling bed matrix volume, that is, buildup and shed dynamics. This involves designing around competing desirable objectives:

1. Provide a support framework microstructure and dosing regime that enables humus to accrete within the bed over time.
2. Manage solids removal/shed from the bed so that the macro pore drainage/ventilation spaces within the bed do not fill up and lead to restricted ventilation throughout the bed or impeded drainage which would prevent bypass of effluent that can not be rapidly absorbed by the humus matrix hydraulic capacity.
3. Allow fine solids to be retained or pass out of the bed matrix in such a way that fine pores within the humus matrix do not fill over time and create a dense matrix with little or no larger pore spaces.
4. Enable easy removal of accumulated solids in excess of that needed for optimum treatment.

Design features used to enhance removal of suspended organic matter, minimise channel flow and promote humus buildup in the humus matrix involve:

1. Creating surge buffer surge flow reservoirs within the bed but in particular within the upper easily accessible layers.
2. Placement of partial flow barriers within the structured bed to intercept and prevent both vertical and horizontal channel flow.
3. Mechanical dosing of stored effluent, some of which may have passed through the pore channels rather than the humus matrix, onto the top of the bed in small enough doses to prevent channel flow.

If effluent moves slowly through the bed in matrix flow the bed structure is less disturbed and broken down, rather the humus is trapped and accretes in the bed and forms stable aggregates through the action of living organisms in the biolytic filter ecosystem. Gentle flow has the further advantage of promoting good exchange of effluent into and out of the humus matrix.

The opposite application principle of applying effluent in larger doses to deliberately produce channel flow conditions will create the effect of shedding solids from the humus matrix under those circumstances where solids shed is desired.

A design principle to prevent bed buildup on its peripheral surfaces is to enable controlled erosive surface flow to occur over the surface and sides of each bed element module, but to provide sufficient protection to the surface of the bed at the intended long term surface level to prevent erosion of the humus matrix below this level. The method of providing erosive flow is to channel the peak flow of the raw effluent applied to the bed as generated over the supported humus matrix surfaces. The structural support framework can be made in such a way as to provide inherent stabilisation of the surface at a defined level much as tree roots provide protection from erosive flood flows to the soil on stream banks but allow material above the root mat to be washed away. A porous net like plastic mesh can provide this stabilisation function. Material build up above the plastic mesh layer can be eroded away and the humus matrix below it is protected somewhat. For this to be functional, the module or bed surfaces must have a controlled flow over the surfaces. This can be achieved by making the module elements with a surface that is discretely sloped. The slope is determined by the saturated infiltration rate of the humus matrix and should be great enough that when the humus matrix is saturated any further effluent applied flows off the bed in preference to forcing hydraulic flow through the larger pores in the humus matrix. Any slope which more or less achieves this objective will be acceptable. Because it is not desirable to have the excess effluent flow to a low point on the bed surface and accumulate fines through sedimentation, but rather to drain away quickly, the modules may be made with a sloping surface and base which slopes the opposite way so that the crates can fit together as a stable vertical structure by having a base module with the appropriate upper slope and a level base so that the entire stack of modules could be stacked on a level surface and produce a zig zag effluent overflow path from the discharge point to the base module. The other benefit of this sloping surface creating a flow path for the effluent is that it enables the entire surface of the humus matrix to be wet evenly by the effluent. The surface should be formed in such a way that it naturally spreads the effluent over the entire surface rather than concentrating flow. This spreading effect allows passive discharge of raw effluent onto the bed at one point to be spread evenly and at the correct dose over the entire surface of the bed.

Mechanical Dosing

If the humus matrix volume is insufficient to absorb all of the effluent dosed onto it in an as generated effluent peak through the passive dosing means described above and so some of the effluent passes over the entire surface of the fractured bed and accumulates in a storage zone in the base, it is possible to use a small pump to mechanically dose the effluent back over the bed in optimal doses to get matrix flow through the entire bed volume and so ensure that there is maximum retention time in the bed. The dose volume must be sufficient to almost bring the humus matrix to field capacity. The doses must be timed so that air can recharge the fine pore spaces in the humus matrix between doses and so prevent anaerobic conditions developing within the humus matrix. Dosing can be controlled electronically. Ideally the controller can have logic built in to enable it to optimise the dose frequency to compensate for changing hydraulic loads through a simple level sensing arrangement in the stored effluent container Mechanical dosing may be an advantage even where the bed volume is sufficient to absorb as generated flows if higher standards of effluent are required of the effluent discharged from the system.

Nitrogen Removal

It is sometimes desirable to remove nitrogen from effluent for environmental reasons. It has been observed in a variety of wastewater treatment applications such as denitrifying sand filters and activated sludge plants designed for nitrogen removal that biological removal of nitrogen from effluent is possible by passing effluent containing oxidised nitrogen (nitrite and nitrate) through an anoxic zone within which high dissolved carbon concentrations are found. Microbial organisms metabolise this carbon by taking oxygen from the oxidised nitrogen compounds resulting in the release of nitrogen gas, which is lost harmlessly to the atmosphere. In this way the total nitrogen in the effluent is reduced. The use of controlled dosing of effluent onto the high COD zone in or immediately below the organic solids deposition zone of the biolytic filter can be used to create nitrogen removal potential within any biolytic filter system. Recirculation of nitrified effluent has value in this context.

Buoyant Media Life Raft

The use of open support aggregate bed elements has been discussed above as a means of supporting humus matrix from collapse. It is important in a biolytic filter that the organisms responsible for structuring this humus matrix into a highly efficient filtration media and preserving its structure are preserved from accidental drowning through flooding. If the organisms can move upward faster than the rate of water level rise they will concentrate on the surface of the bed. The open support aggregate structured bed allows for this upward migration of adult organisms. Stable humus matrix with little air entrained is slightly heavier than water and will be submerged by rising water. The surface layers are sometimes naturally buoyant dependent on the amount of paper and other such fibrous material added to the bed as organic solids and the amount of air entrained. Sometimes this phenomenon naturally preserves many invertebrates in the event of flooding, but not always. It is proposed that the open support aggregate structured bed elements be made using durable buoyant plastic or foams as the humus matrix support lattice material so that in the event of flooding the upper portion of a random media fractured bed could form a stable life raft for an indefinite period where a buried container can not be provided with an emergency overflow drain below the surface of the bed.

BRIEF DESCRIPTION OF THE DRAWING

The sole drawing, FIG. 1, illustrates a cross-sectional view of a three dimensional humus matrix lattice according to the present invention, in a septic tank arrangement.

DESCRIPTION OF PREFERRED EMBODIMENT

Referring to the drawing, the humus matrix support lattice structured bed biolytic filter comprises a conventional septic tank 1 with effluent inlet 2 and filtrate outlet 3. A submersible pump 4 is located in a sump in the base zone of the tank and an overflow duct is located in an upper region 11.

The tank contains support lattice bed elements of two types. Humus matrix elements 5, to provide long retention and filtration of effluent, and drainage matrix elements 6 to provide drainage, upper bed support and aeration. These elements 5, 6, are formed by cutting flexible corrugated plastic drainage pipe and bagging it in open mesh bags either with a humus like substitute such as peat (humus matrix elements) or without (drainage matrix elements).

Drainage bed elements 6 are formed into a layer in the base of the tank, with several humus matrix layers 5 above it, each placed over a geotextile flow barrier 7 designed to reduce channel flow, trap suspended solids, and induce good effluent matrix exchange.

A screening layer 8 of knitted plastic fabric with pore size of 1–2 mm is placed at the upper surface layer to retain gross solids in the effluent and to prevent plastic bags and other contaminants from being washed down into the humus matrix support lattice structured bed. High peak flows of wastewater are quickly screened of gross solids by this screening layer and bypassed to a surge buffer reservoir area 9 in top of the tank prior to leaking slowly through the structured bed.

The surge buffer reservoir 9 is formed in the upper layer by placing a geotextile fabric layer with humus matrix elements at the overflow zone and drainage matrix elements in the surge reservoir zone so as to form a permeable walled surge tank whose porosity is continuously regenerated by the action of worms and other invertebrates.

The effluent from this surge buffer reservoir 9 passes into a second surge buffer reservoir 10 before flowing both vertically through a horizontally placed layer of fine geofabric and horizontally through a layer of humus matrix elements 5. This pattern is repeated several times before the filtered water finally enters a storage sump from which it is either recirculated into the upper zone of the bed or discharged as filtrate through outlet 3.

The geotextile flow barriers 7 do not form a complete barrier, but rather are cut smaller than the horizontal surface area of the container it is embedded in so as to cover only about $7/8^{th}$ of the surface. The barriers are juxtapositioned so as to produce a long meandering flow path where effluent that is induced by the semipermeable geotextile layers to flow horizontally off one geotextile layer is discharged onto another at a distance from its overflow edge and so on.

This arrangement allows unimpeded drainage and aeration channels to be maintained through out the bed and minimises channel flow.

The invention not only overcomes the limitations referred to in the preamble of the specification, but also provides a number of surprising disadvantages, including:

1. Treatment capacities at least 10 times those of competing primary treatment technologies.
2. Single pass treatment to secondary standard in a conventional septic tank.
3. Extremely high passive oxygen exchange capacity throughout the bed.

What is claimed is:

1. A biolytic filtration system for the simultaneous treatment of wastewater and solid organic waste material comprising a filtration bed including decomposed humus, said decomposed humus supporting a colony of living organisms wherein the filtration bed is formed within and supported by a three dimensional humus matrix lattice.

2. A biolytic filtration system according to claim 1, wherein the architecture of the humus matrix support lattice is such as to create the maximum possible exposed approximately horizontal humus matrix surface area to bed ratio, and also humus matrix volume to bed volume ratio.

3. A biolytic filtration system according to claim 1, wherein the three dimensional humus matrix lattice is formed from a material selected from the group consisting of plastics materials, metals, composites, fired natural products, and combinations thereof.

4. A biolytic filtration system according to claim 3, wherein the three dimensional humus matrix lattice is formed from plastics material.

5. A biolytic filtration system according to claim 4, wherein the three dimensional humus matrix lattice consists of sections of corrugated plastic drainage pipe which are cut into discrete lengths which approximate the diameter of the pipe.

6. A biolytic filtration system according to claim 5, wherein the cut sections of corrugated plastic drainage pipe are contained within mesh bags.

7. A biolytic filtration system according to claim 4, wherein the three dimensional humus matrix lattice consists of a stackable moulded plastics or composite crate element.

8. A biolytic filtration system according to claim 7, wherein the three dimensional humus matrix lattice consists of a plurality of interlockable crate elements.

9. A biolytic filtration system according to claim 7, wherein the crate elements have sufficient structural rigidity to enable the entire combination of crate elements, when lined with a plastic liner, to be buried in the soil without collapse or flotation.

10. A biolytic filtration system according to claim 8, wherein the interlockable crate elements are stacked vertically and the surface of each crate element slopes.

11. A biolytic filtration system according to claim 10, wherein the surface slope of the crate elements is such that when the humus matrix is saturated, any further effluent applied flows off the bed in preference to forcing hydraulic flow through larger pores in the humus matrix.

12. A biolytic filtration system according to claim 10, wherein the interlockable crate elements, when stacked on a level surface, produce a zig zag effluent overflow path from an overhead effluent entry point to the bottom of the filtration bed.

13. A biolytic filtration system according to claim 12, wherein the crate elements form an integral structure which contains the filtration bed without the need far a separate container.

14. A biolytic filtration system according to claim 1, and including semi-permeable horizontally placed flow control barriers sandwiched between layers of the three dimensional humus support matrix lattice elements.

15. A biolytic filtration system according to claim 14, wherein the flow control barriers cover between about two-thirds and seven-eighths of the filtration bed.

16. A biolytic filtration system according to claim 1, wherein the three dimensional humus matrix lattice includes a buoyant open support aggregate to induce upper bed flotation.

* * * * *